United States Patent [19]
Rosen et al.

[11] 3,739,070
[45] June 12, 1973

[54] TEACHING ASSIST
[76] Inventors: David B. Rosen, 31 Arthur Avenue, Apt. 12, East Providence, R.I. 02914; William P. Torrey, 1 Whetstone Drive, Apt. 5, Gaithersburg, Md. 20760
[22] Filed: June 30, 1971
[21] Appl. No.: 158,204

[52] U.S. Cl. ............................................. 35/48 A
[51] Int. Cl. ............................................. G09b 1/00
[58] Field of Search .................. 35/48 A, 9 E, 9 F, 35/35 E

[56] References Cited
UNITED STATES PATENTS
2,883,767  4/1959  Bell et al. ............................ 35/35 E
2,725,644  12/1955  Wade et al. .......................... 35/48 A
3,478,440  11/1969  Ritchie et al. ........................ 35/9 H
2,137,736  11/1938  Watkins ............................... 35/48 A Primary Examiner—Robert W. Michell
Assistant Examiner—J. H. Wolff
Attorney—Ralph R. Roberts

[57] ABSTRACT

This invention pertains to a teaching assist or device which includes a base sheet printed on two sides after which it is folded. A set of questions or instructions printed on the front or face side of the base sheet and visible through an overlying transparent sheet is attached to the end of said base sheet. On this transparent overlay the student writes his answer by means of a wax pencil or the like. After the student has completed the instructions or applied the indicated answers to the outer surface of the transparent sheet in accordance with the printed instructions the transparent sheet is lifted and the folded end of the base sheet is swung onto the face surface so as to bring into view the printed answers on the back of the base sheet. The transparent sheet is then lowered to lay on the folded portion and the correct answers or instructions printed on said back surface of the base sheet. The student's answers as written on the transparent sheet are compared with the printed answers after which the wax marks are erased from the transparent sheet and the assist is again folded for use by another student.

1 Claim, 3 Drawing Figures

PATENTED JUN 12 1973 3,739,070
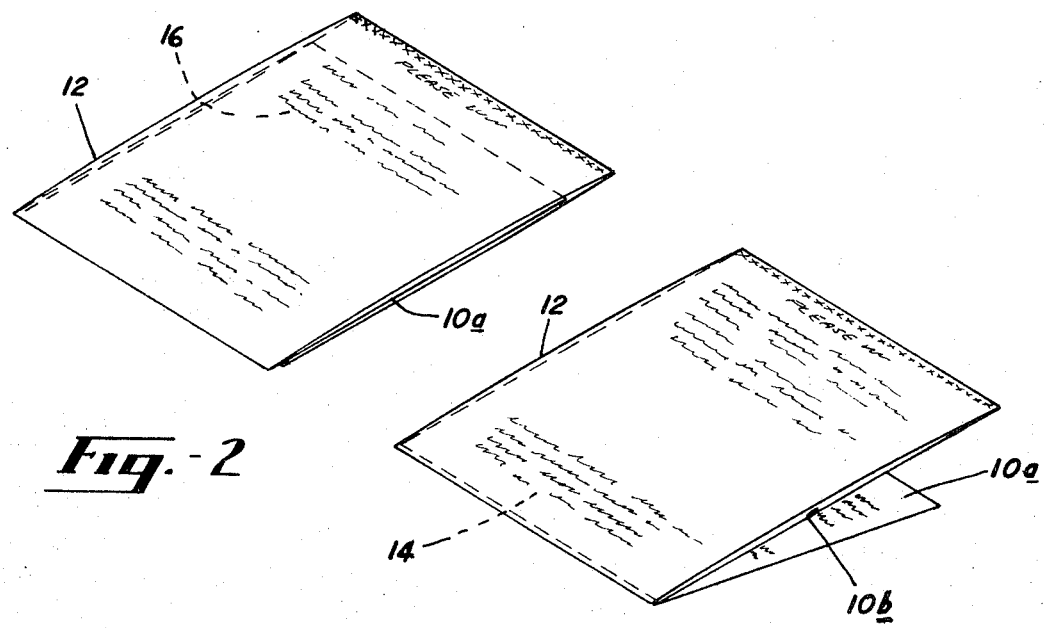
Fig.-2
Fig.-3
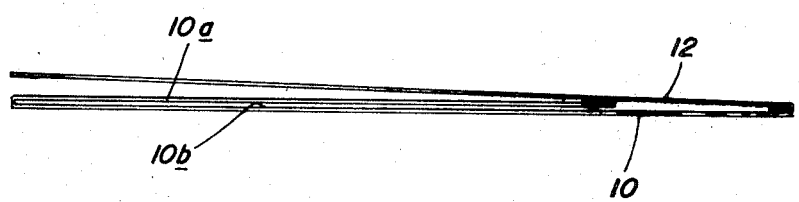
Fig.-1
INVENTOR.
DAVID B. ROSEN
WILLIAM P. TORREY
BY
Ralph R. Roberts
AGENT

TEACHING ASSIST

BACKGROUND OF THE INVENTION

1. Field of the Invention

In accordance with the classification of art as established in the United States Patent Office the present invention pertains to the general class of "Education" and more particularly to the subclass therein of "teaching" and the further subclass thereunder of "question and hidden answer."

2. Description of the Prior Art

In the field of teaching there have been many attempts to provide teaching assists which may be easily and economically produced. Many of these are intended to permit the student to verify his answers, or with the correct answers temporarily concealed, to provide ready means whereby the teacher or monitor may compare the pupil's answers with the correct response. There are many patents proposing to provide such a device among which is U.S. Pat. No. 3,478,440 to RITCHIE which issued Nov. 18, 1969 as well as U.S. Pat. No. 2,725,644 to WADE which issued on Dec. 6, 1955. Also noted is U.S. Pat. No. 2,137,736 to WATKINS which issued Nov. 22, 1938 and also U.S. Pat. No. 2,497,200 to APPELL which issued Feb. 14, 1950. In these and many other patents it has been customary to provide several undersheets underlying a clear plastic top sheet. These undersheets provide both questions as well as the answers to these questions. The student writes his answers on the top transparent film after which the undersheets are torn out for checking by the teacher or a monitor. Educational teaching devices or assistance means are also known where the sheets have questions and answers on the same sheet and in which a pencil is used to mark out squares and the like which then are readily checked by means of an overlying grid. In all of these assist forms the collating of multiple sheets requires skilled assembly and training resulting in a necessary increase in cost over the present invention where it is contemplated that only two sheets are used to make up the testing assist and method. One sheet is the clear plastic film overlay member which of course has no printing thereon. The other sheet is the underlying sheet which is printed on two sides. Of course it is assumed that both sides of this sheet have been printed correctly. With only one printed sheet there is no separation or accidental loss of the underlying sheet as used in the present invention. It is also contemplated that after use the wax crayon applied to the plastic sheet is removed by wiping with an appropriate cloth or a like wiping means which may be treated with solvent so that the educational device of this invention may be reused many times.

SUMMARY OF THE INVENTION

This invention may be summarized at least in part by reference to its object.

It is an object of this invention to provide an educational device in which an underlying sheet is printed on both sides and when folded the face side presents an outline of printed questions or instructions. The questions are on the folded portion of the sheet which is selectively exposed to and placed against a transparent sheet when the bottom sheet is swung around to cover the face side. At one end of this printed undersheet a clear plastic film sheet is attached so as to overlay the printed area of the undersheet and upon this film a wax crayon is used to write the answers to the instructions or questions which have been printed on the folded portion of the undersheet.

In brief, the teaching assist of this invention contemplates a printed undersheet which may be about 8½ by 19 inches in extent. This undersheet is printed on both front and back sides and is folded so as to provide a conventional sheet of 8½ by 11 inches. To one end of this sheet which is away from the folded end is attached a clear plastic film which may be polystyrene of three- to five-thousandths of an inch in thickness. The surface of the plastic film is conditioned so that a person may write upon it with a wax crayon. The printed information on the undersheet is made as two parts, the first of which is the question or direction portion of the teaching information. This portion is contemplated to be printed on the folded bottom side of the printed undersheet with the answer portion printed on its top surface portion. With the folded portion adjacent the film, the student may read the questions or instructions and write the proper answers to the printed questions or instructions. To check the student's response to the instructions or questions the plastic sheet is lifted and the folded portion of the undersheet is swung 180° to expose the other printed portion of the undersheet which contains the correct answers or responses. These correct answers are then compared with the written responses of the student by the student, monitor or teacher.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the teaching assist or device as adopted for use by an instructor or proctor and showing a preferred means for constructing and using said assist. This specific embodiment has been chosen for the purposes of illustration and description as shown in the accompanying drawing wherein:

BRIEF DESCRIPTION OF THE DRAWING

FIG. 1 represents a side view of the educational teaching assist or device of this invention and shows the arrangement of the folded undersheet and plastic cover sheet as assembled for use;

FIG. 2 represents an isometric view in a reduced scale of the teaching assist of this invention with the folded portion as in FIG. 1 into condition for displaying the questions requiring the written responses of the student, and FIG. 3 represents an isometric view of the teaching assist of FIG. 2 with the folded underportion in the initial condition swung out from under the plastic top portion of the undersheet so that the written responses by the student may be checked with the printed answers now visible on the upper face of the undersheet.

In the following description and in the claims various details will be identified by specific names for convenience. These names, however, are intended to be generic in their application. Corresponding reference characters refer to like members throughout the three figures of the drawing.

The drawing accompanying and forming part of this specification discloses certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now to the teaching assist and in particular to FIGS. 1 through 3 it is to be noted that as seen in the side view of FIG. 1 an undersheet of paper 10 is folded to provide a turned upper portion 10a. To the right hand or unfolded end of this sheet 10, as viewed in FIG. 1 there is attached as by an adhesive or heat sealing a plastic cover 12 which may be of polystyrene or other inexpensive transparent material. As reduced to practice, a film sheet of three- to five-thousandths of an inch in thickness has been satisfactory.

Referring now to FIGS. 2 and 3 it is to be noted that the upper face of turned portion 10a has printed thereon indicia 16 in the nature of questions, instructions, diagrams or the like which are to be studied by the student. These questions or instructions are printed on face portion 10a and the student in response to the questions or instructions writes with a wax pencil the appropriate answers or responses on the upper or outer face of the plastic cover member 12.

As seen in FIG. 2 and in the condition of FIG. 1 the upper or exposed face of sheet portion FIG. 10a has the printed questions and instructions. This portion 10a in the condition of FIG. 1 covers the underportion 10b of the sheet 10 so that the answers to the questions, and answers are hidden from the student. Hence, this cover portion 10a is preferably repeated on surface 10b with the correct responses printed therewith. After the student has finished writing upon the surface 12 in response to the printed questions 16, the teaching assist may be returned to the instructor or may be passed to another student. It may also be graded by a monitor or if desired may be retained by the student who compares his answers with those printed on the face portion 10b of the assist. This is done with the written response compared with the printed portion 10b after sheet 10 has been removed to a position underneath the plastic film 12 by lifting the left end of film 12 whereupon the portion 10a is turned underneath to bring the printed portion 10b to the condition of FIG. 1. Portion 10a is now in front of the plastic sheet 12 whereat the student's written response may be compared to the printed answers now exposed. The student, the instructor or the monitor may now quickly compare the accuracy of the student's response to the instructions, questions or diagrams whose answers are printed on portion 10b.

USE OF THE EXEMPLIFIED TEACHING ASSIST

As above-indicated it is contemplated that the portion 10a of sheet 10 be printed upon the lower or bottom face with the preferred the series of questions which are intended to be answered by the student. This portion with printed queries 16 is brought adjacent the plastic cover sheet 12 when portion 10a is folded as in FIGS. 1 and 2. The printed portion 16 is disposed to be read by the student who then utilizes a wax pencil or crayon to write his or her answers upon the outer or upper surface of plastic sheet 12. When the student has finished complying with the instructions or has completed the questions the teaching device as thus arranged may be returned to the teacher or passed to a monitor or some other student. To evaluate the student's response the holder of the assist lifts the plastic sheet 12 from in way of the surface 10a and causes this fold portion of the undersheet 10 to be turned at its folded edge and swung under sheet 10 to expose the printed answers 14 to be viewed through plastic sheet 12. This is seen in FIG. 3 wherein the printed response portion of sheet 10 now lies immediately under the plastic sheet 12. The question portion 10a is folded underneath the board portion 10 where it remains until the evaluation of the student's response has been completed. It may then be reinserted underneath the upper portion of undersheet 10 by refolding the underportion 10a to the condition of FIG. 2. When and if the teaching device is to be reused by other students the wax pencil or crayon marks are removed from the plastic sheet by conventional wiping means either by cloth or a solvent treated damp cloth, paper sheet, sponge or other means.

As reduced to practice the plastic sheet 12 is wider than the attached undersheet 10. In the folded condition of either FIG. 2 or 3 the plastic sheet 12 also is disposed to extend a short distance beyond the folded edge of sheet 10. For example, sheet 12 may extend about three-sixteenths of an inch beyond the longitudinal sides of sheet 10 and about one-sixteenth of an inch beyond the folded edge. With the plastic sheet 12 extending beyond the edges of undersheet 10 the erasing of the wax crayon from the outer surface of sheet 12 can be readily accomplished without soiling the undersheet 10. This extends the useful life of the assist to permit a great number of use occurrences of the assist without undue soiling.

The two-piece construction of this teaching assist in which the undersheet 10 is printed on two sides and is folded at a precise position so that positive orientation is maintained for reading both the questions and responses thereto enables this teaching assist to be both easily used and economical to produce. Whereas many teaching devices use carbon paper, tear-away sheets, the present assist contemplates a long reuse and initial low cost.

Although the teaching assist, as shown, is folded to have the printed instructions read parallel to the fold line, it is of course readily apparent that the printing could be normal to the fold line. As to whether the assist, in a folded condition, is 8½ by 11 inches or some other size is also a matter of choice.

Whether the plastic sheet 12 be glued to the end of sheet 10 or attached by heat sealing, stapling or stitching is merely a matter of choice and economy. Whatever the method, the attachment of sheet 12 to the end or edge of folded sheet 10 may be made by conventional means with little registration requirements since plastic sheet 12 has no printing thereon. All registration of printing occurs only on sheet 10 and requires reasonably careful printing of both sides of sheet 10 and a fold made at the predetermined position.

Terms such as "left," "right," "up," "down," "bottom," "top," "front," "back," "in," "out" and the like are applicable to the embodiment shown and described in conjunction with the drawing. These terms are merely for the purposes of description and do not necessarily apply to the position in which the teaching assist may be constructed or used.

While a particular embodiment of the teaching assist has been shown and described it is to be understood the invention is not limited thereto since modifications may be made within the scope of the accompanying claims and protection is sought to the broadest extent the prior art allows.

We claim:

1. An assembled two-piece teaching device comprising an elongated rectangular opaque sheet, an elongated rectangular transparent sheet the opaque and transparent sheets being attached at one end and as attached being retained in an alignment and hinged condition permitting the transparent sheet to lay flat against one surface of the opaque sheet or be swung by its free end away from said surface, said opaque sheet having a fold line which is transverse of its longer sides and intermediate the ends thereof, said fold line providing an integral first panel which is of a lesser length than the remaining second panel with said second panel extending to the end attached to the transparent sheet, said opaque sheet being printed on both its surfaces, the printing on the second panel including instructions and answers to queries printed on the first panel, the printing on said second panel being on the surface facing the transparent sheet while the printed queries on the first panel are printed on the opposite surface and at 180° orientation from the printing on said second panel, and when the transparent sheet is swung away from the attached opaque sheet the first panel may be manipulated to an overlay position with the first panel superimposed on said second panel so that the first panel conceals the printed answer portion on the second panel, the printing on the first and second panels in relation to the fold line is arranged to provide continuity in the information so that when the transparent sheet rests on the overlaid printed queries of the first panel the outer surface of the transparent sheet is adapted for writing responses thereon by a wax crayon, these responses to said queries inscribed by the use of said wax crayon appearing on said transparent surface, a comparison of a response with a proper answer being visually accomplished after said transparent sheet has been swung away from the folded opaque sheet and the first panel has been rotated from the second panel after which the transparent sheet with the inscribed responses is laid on the second panel for comparison with the printed answers therein, said transparent sheet also being of a size and arrangement so that this transparent sheet extends beyond the sides and the line of the folded opaque sheet to provide protection to said opaque sheet while and during the use and subsequent cleaning of the crayon marks from the transparent sheet for reuse and to provide ease of manipulation of the transparent sheet during the turning and placement of the first panel.

* * * * *